(12) United States Patent
Dawson

(10) Patent No.: US 6,309,131 B1
(45) Date of Patent: Oct. 30, 2001

(54) REDUNDANT CLEVIS PIN PAIR

(75) Inventor: John Dawson, Boxford, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/181,898

(22) Filed: Oct. 29, 1998

(51) Int. Cl.$^7$ .............. B24D 27/26; F16C 11/00; F16D 1/12
(52) U.S. Cl. .................. 403/79; 244/54; 403/11; 403/156; 403/157; 403/337; 403/338
(58) Field of Search .................. 403/79, 157, 161, 403/154, 150, 340; 60/39.31; 248/644, 646, 648; 411/385, 338, 339; 244/54

(56) References Cited

U.S. PATENT DOCUMENTS

| | | | |
|---|---|---|---|
| 413,700 | * 10/1889 | Wood, Sr. ............... | 403/150 |
| 930,232 | * 8/1909 | Rodman ................. | 403/161 |
| 2,292,128 | * 8/1942 | King ..................... | 411/338 |
| 2,386,093 | * 10/1945 | Dath ..................... | 105/200 |
| 2,399,210 | * 4/1946 | Dath ..................... | 105/200 |
| 2,519,464 | * 8/1950 | Haseltine .............. | 403/344 |
| 3,245,705 | * 4/1966 | Fangman ............... | 403/154 |
| 3,922,946 | * 12/1975 | Grayson ................ | 411/385 |
| 3,923,349 | * 12/1975 | Herbst .................. | 403/228 X |
| 4,478,546 | * 10/1984 | Mercer .................. | 411/383 |
| 4,786,202 | * 11/1988 | Arnold et al. ......... | 403/156 X |
| 5,277,382 | * 1/1994 | Seelen et al. .......... | 244/54 |
| 5,303,880 | * 4/1994 | Cencula et al. ........ | 244/54 |
| 5,320,307 | * 6/1994 | Spofford et al. ....... | 244/54 |
| 5,725,181 | * 3/1998 | Hey ...................... | 244/54 |
| 5,865,557 | * 2/1999 | Kasim .................. | 403/157 |
| 5,871,177 | * 2/1999 | Demouzon et al. ... | 244/54 |
| 5,873,547 | * 2/1999 | Dunstan ............... | 244/54 |
| 5,921,500 | * 7/1999 | Ellis et al. ............ | 244/54 |

FOREIGN PATENT DOCUMENTS

| | | | |
|---|---|---|---|
| 270504 | * 5/1927 | (GB) ........... | 403/157 |
| 457767 | * 4/1936 | (GB) . | |
| 74466 | * 1/1949 | (NO) ........... | 411/385 |

* cited by examiner

Primary Examiner—Lynne H. Browne
Assistant Examiner—Ernesto Garcia
(74) Attorney, Agent, or Firm—Andrew C. Hess; Nathan D. Herkamp

(57) ABSTRACT

A clevis pin joins a thrust link to a support in an aircraft engine thrust mount. The pin includes a shank having a semicircular section for carrying in shear thrust load between the link and support. A head is disposed at one end of the shank, and a tip is disposed at an opposite end of the shank. In a preferred embodiment, a pair of the pins are nested together for collectively effecting a circular cross sectional area for carrying the thrust load in shear therethrough.

27 Claims, 4 Drawing Sheets

REDUNDANT CLEVIS PIN PAIR

BACKGROUND OF THE INVENTION

The present invention relates generally to gas turbine engines, and, more specifically, to aircraft engine mounts therefor.

A gas turbine engine may be mounted to an aircraft below a wing, in the tail, or side mounted to the fuselage for example. This is typically accomplished by using a pair of forward and aft engine mounts which support the engine to the aircraft at two axially spaced apart locations. The forward and aft mounts are differently configured for carrying the various engine loads experienced during operation.

More specifically, the weight of the engine in the vertical direction is shared by the engine mounts. The engine produces thrust during operation which is typically carried to the aircraft through primarily only one of the two mounts. And, the mounts are also configured for carrying other vertical and horizontal loads, as well as bending moments which are generated during aircraft movement.

The various components of the engine mounts are either bolted to cooperating supports, or utilize shear pins extending through devises which mount spherical rod ends, commonly referred to as uniballs, formed in the ends of mounting links. The mounting links are typically configured for limiting their load carrying capability to either tension or compression. The typical thrust link extends axially along the centerline axis of the engine for carrying to the aircraft thrust produced by the engine in the axial direction. One or more thrust links may be used for carrying thrust with each link using cylindrical shear pins having maximum shear strength capability within the limited solid circular section thereof.

Since space and weight are important aircraft design constraints, the weight of the engine mounts and the envelope thereof should be as small as possible for carrying all required loads during operation with suitable longevity.

Furthermore, increased safety in the engine mounts is typically effected by providing redundant load paths which continue to support the engine in the event of primary load path failure. Redundant load paths are typically effected using additional levers or links and joining pins which either actively carry a share of normal engine loads, or are inactive until failure of the primary load path at which time they then become active for carrying the engine loads. The engine mounts therefore vary in complexity, weight, envelope, and redundancy in various combinations to maximize engine mount integrity, but with various compromises.

Accordingly, it is desired to provide an improved engine mount having redundant load paths in a compact and lightweight configuration.

BRIEF SUMMARY OF THE INVENTION

A clevis pin joins a thrust link to a support in an aircraft engine thrust mount. The pin includes a shank having a semicircular section for carrying in shear thrust load between the link and support. A head is disposed at one end of the shank, and a tip is disposed at an opposite end of the shank. In a preferred embodiment, a pair of the pins are nested together for collectively effecting a circular cross sectional area for carrying the thrust load in shear therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
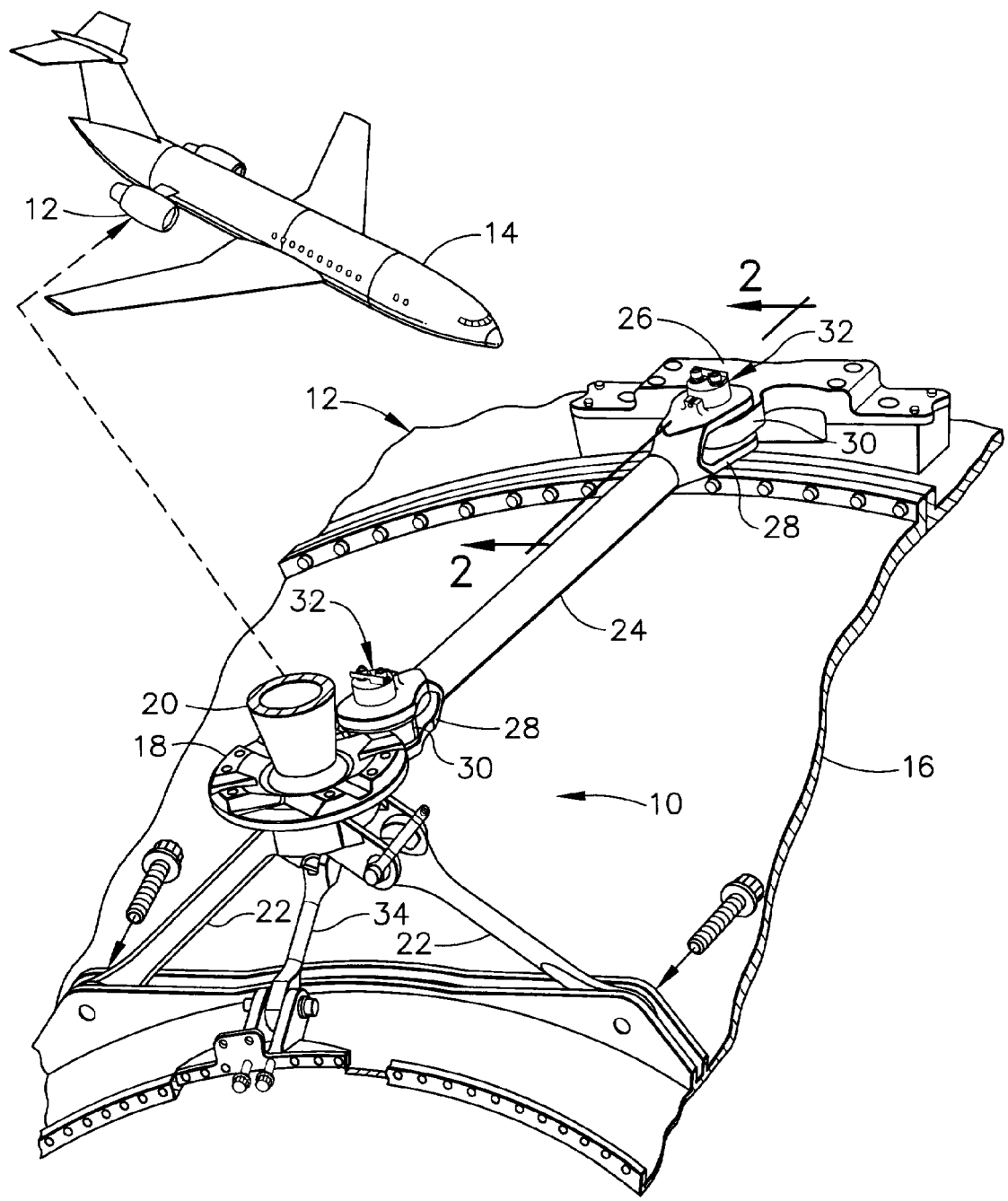
FIG. 1 is an isometric view of an exemplary aircraft engine aft mount including a thrust link having mounting pins therein in accordance with an exemplary embodiment of the present invention.

Illustrated in FIG. 1 is an aft engine mount 10 for supporting an aircraft gas turbine engine 12 to the fuselage of an aircraft 14. In the exemplary embodiment illustrated, the aft mount 10 is used in conjunction with a forward mount (not shown) for mounting the engine horizontally to the side of the aircraft 14 near its tail.

The engine 12 is a conventional turbofan gas turbine engine having an outer casing 16, shown in part, to which the forward and aft mounts are connected for supporting the engine to the aircraft fuselage. The aft mount includes an aft support 18 in the form of a circular plate which engages the spherical distal end of an airframe fitting 20 fixedly joined in the aircraft.

The aft mount includes a pair of side links 22 which extend circumferentially from the aft support 18 and generally tangentially to corresponding supporting flanges of the engine casing 16. One side link is integrally formed in the aft support 18, and has an opposite end pin mounted to the casing using a conventional spherical bearing, commonly referred to as a uniball, with a mounting pin extending therethrough into the flange clevis. The opposite side link is pivotally mounted at one end to the support 18, and is mounted at its opposite end to a corresponding clevis in the casing 16 also using a uniball and mounting pin therethrough. The side links 22 carrying in-plane horizontal and vertical loads from the engine to the aircraft.

Thrust loads are carried from the engine to the aircraft using an axially extending thrust link 24 joined at one end to the aft support 18, and joined at its opposite, forward end to a forward yoke or support 26 fixedly joined to the casing 16. The thrust link 24 has a pair of devises 28 integrally formed at opposite ends thereof which engage complementary tongues 30 extending integrally from respective portions of the aft and forward and supports 18,26 in a tongue-and-groove arrangement.

In accordance with the present invention, clevis pins 32 are provided for both of the devises 28 for pivotally joining the thrust link 24 to the aft and forward supports 18,26 in redundant load paths. But for the respective clevis pins 32, the illustrated aft mount 10 is conventional in configuration and function, and has enjoyed successful commercial use in this country for many years. In the conventional aft mount, solid, cylindrical clevis pins are used instead of the improved clevis pins 32, and each conventional pin fails to provide any redundant load path therethrough.

In the event of failure of one of the conventional clevis pins due to cracking therein, thrust loads bypass the thrust link 24 and are carried by a failsafe thrust link 34 which is also pin mounted between the aft support 18 and the engine casing 16. During normal operation, the main thrust link 24 is active and carries the thrust loads, with the failsafe link 34 being inactive and does not carry any portion of the thrust loads. Any failure of the thrust link 24 itself, or its supported ends, allows the thrust loads to be carried instead by the failsafe link 34 which then becomes active.

Figure 2:
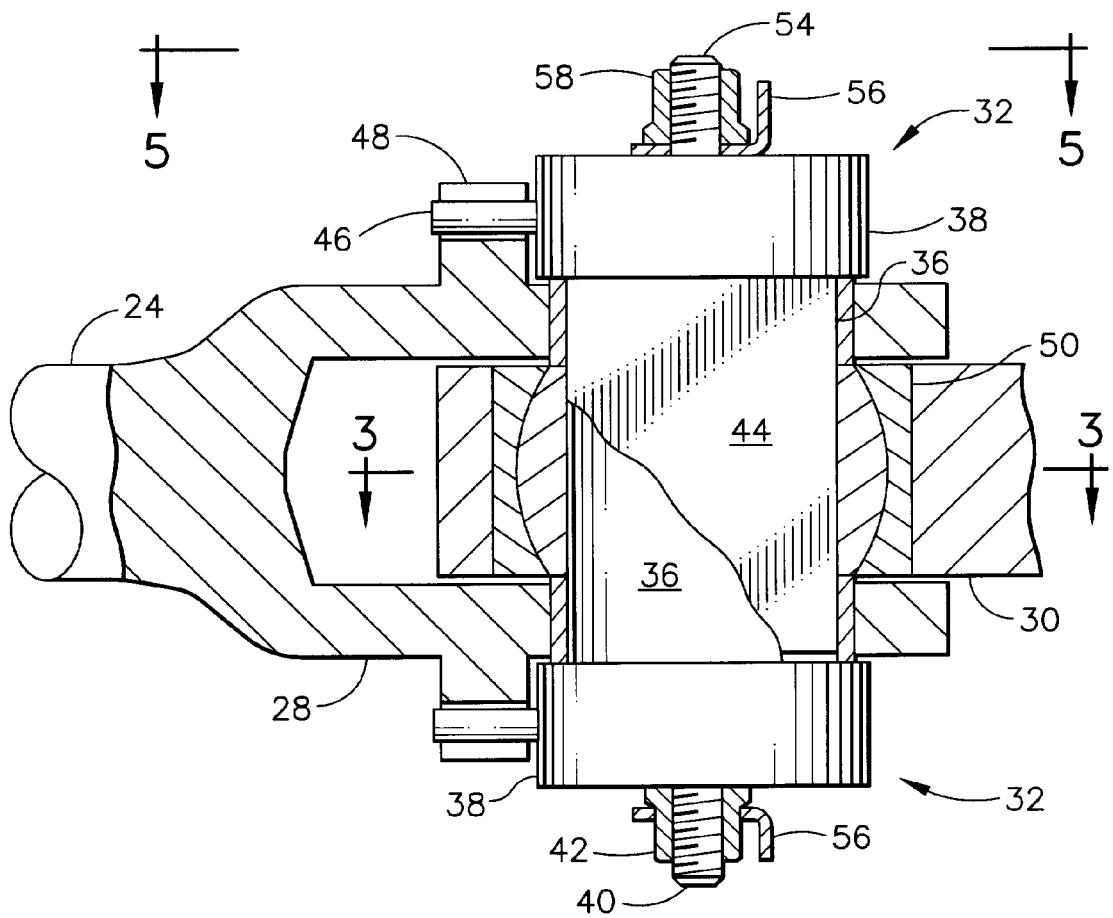
FIG. 2 is a partly sectional, elevational view of a redundant clevis pin pair at one end of the thrust link illustrated in FIG. 1 and taken along line 2—2.
Figure 3:
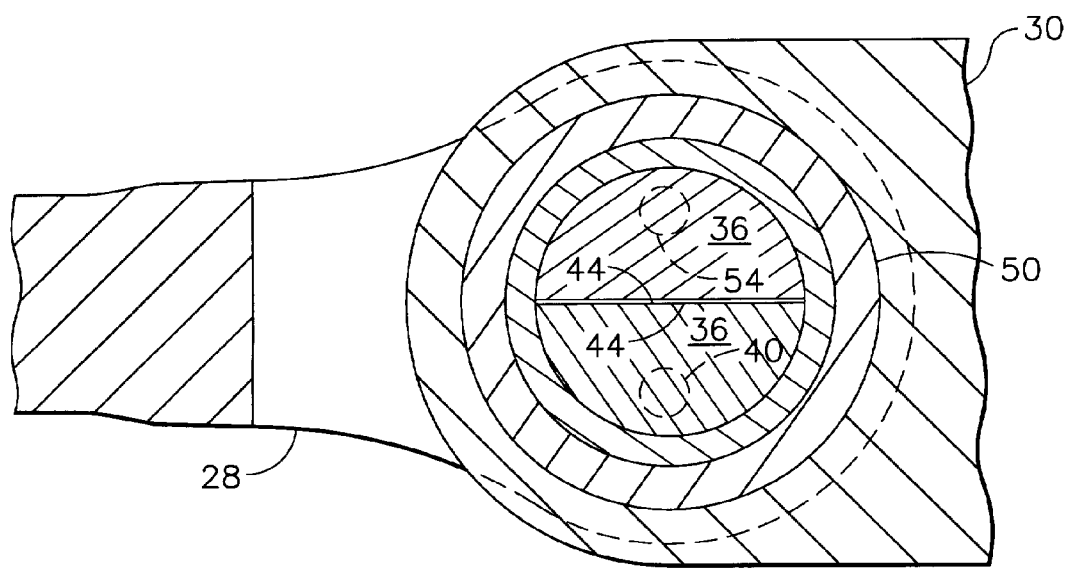
FIG. 3 is a radial sectional view through the clevis pin pair illustrated in FIG. 2 mounted in a clevis and taken along line 3—3.

The improved clevis pins 32 illustrated in FIG. 1 may simply replace the conventional clevis pins, but provide redundant load paths therethrough in accordance with the present invention illustrated in more particularity in FIGS. 2 and 3. The clevis pins 32 are used in pairs to provide redundant load paths in shear between the tongue 30 and the clevis 28.

Figure 4:
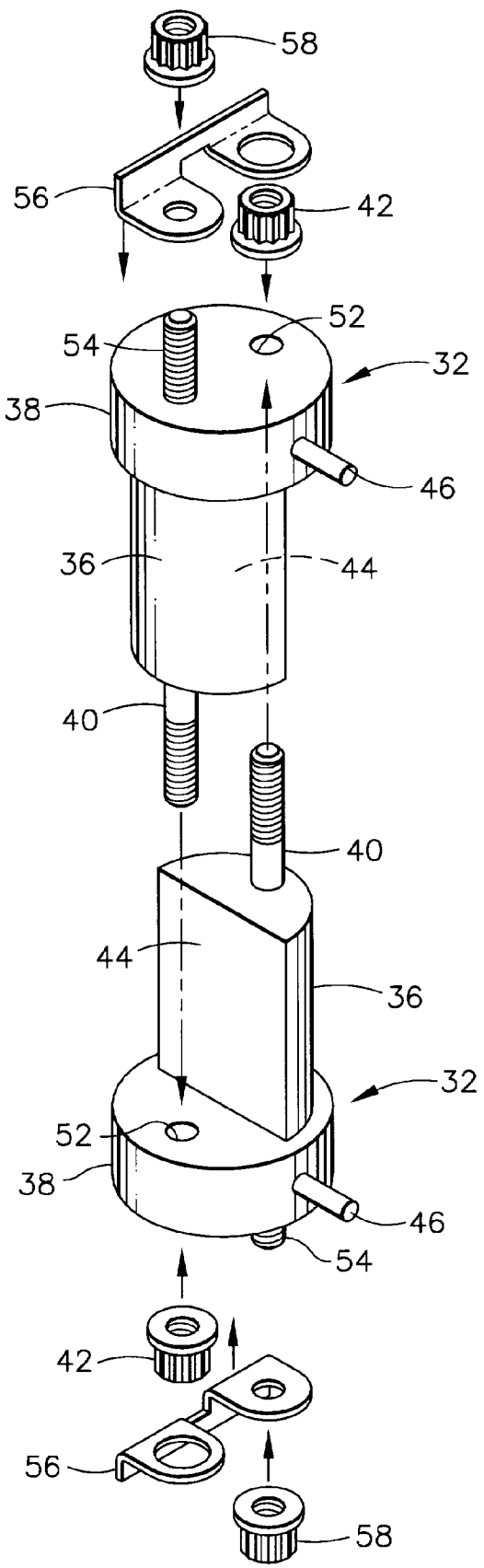
FIG. 4 is an exploded isometric view of the clevis pin pair illustrated in FIG. 2.

An exemplary pair of the clevis pins 32 is illustrated in exploded view in FIG. 4. The two pins are preferably identical in configuration and are complementary with each other for being nested together to collectively form a redundant, bifurcated clevis pin assembly. Each pin includes a shank 36 having a semicircular, solid section extending longitudinally or axially between opposite ends thereof for carrying in shear the thrust loads between the thrust link 24 and each of the aft and forward supports 18,26 shown in FIG. 1. Each clevis pin 32 illustrated in FIG. 4 also includes an enlarged head 38 which is preferably cylindrical and is integrally joined to one end of the shank. A tip 40 is integrally joined as an extension to the opposite longitudinal end of the respective shanks.

The pin head 38 is preferably larger in section than the shank to receive in abutment thereagainst the tip 40 from the complementary pin 32. The pin tip 40 is preferably no larger in section than the corresponding shank, and is threaded for engaging a complementary retention nut 42.

As initially shown in FIG. 4, each shank 36 includes a flat or land 44 which preferably extends the full diameter and axial length of the semicircular shank.

The two clevis pins 32 are preferably identical to each other, and the shank flats 44 are positioned to abut each other in a collective circular section illustrated in FIG. 3 for providing maximum shear strength capability within the circular envelope of the two abutting shanks 36. The abutting flats 44 are disposed along a diameter of the collective circular section along the neutral axis thereof. Since peak shear stress occurs along the neutral axis of a circular section, maximum available area is provided by the respective flats 44 for withstanding the shear loads transferred through the two pins 32 during operation. The flats 44 are preferably aligned with the longitudinal or axial axis of the thrust link 24 illustrated in FIGS. 1 and 2 to maximize the shear strength of the bifurcated pin assemblies joining the two devises 28 to the respective support tongues 30.

In the preferred embodiment illustrated in FIGS. 2 and 4, both the head 38 and tip 40 of each pin are preferably annular and generally axially coextensive with the respective shanks 36. Each head 38 preferably includes an integral alignment tab 46 which provides a visual indication having a predetermined or fixed orientation with the respective flats 44 for allowing the shanks 36 to be suitably aligned for maximizing shear strength orientation thereof.

Figure 5:
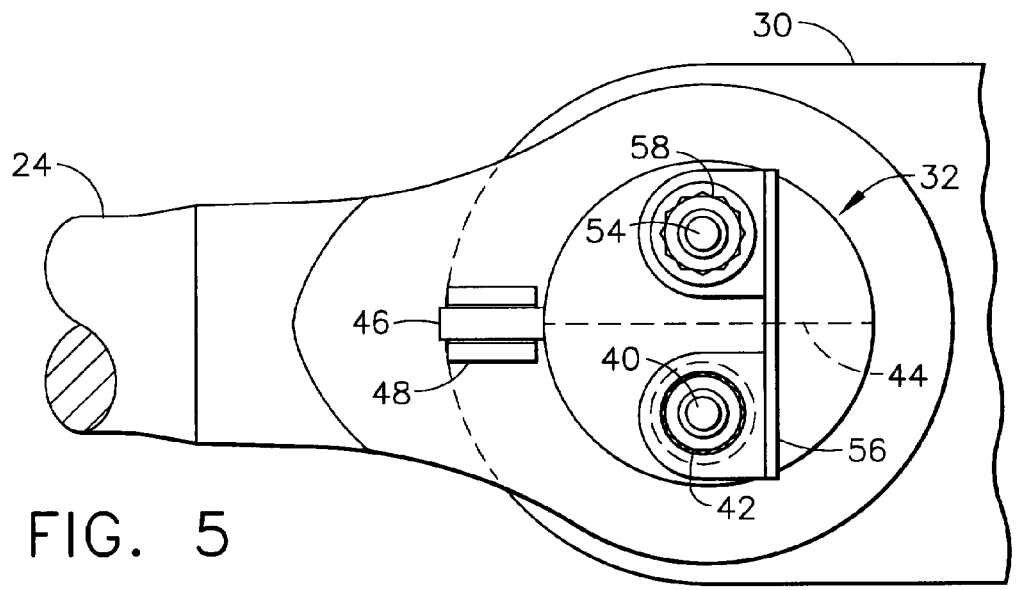
FIG. 5 is a top view of the clevis pin pair illustrated in FIG. 2 and taken along line 5—5.

When the clevis pins 32 are installed to join the thrust link 24 and supports 18,26, the alignment tabs 46 may simply be disposed in complementary recesses 48 integrally formed in corresponding bosses in the devises 24 as best illustrated in FIGS. 2 and 5. In this way, each recess 48 receives a respective tab 46 for aligning the shank flats 44 axially between the thrust link and the supports. In this embodiment, the tab 46 is simply aligned parallel with the flat 44 and is disposed in the recess 48 along the longitudinal axis of the thrust link 24 for effecting proper alignment of the respective shanks 36.

As shown in FIG. 2, each clevis 28 is in the form of a U-shaped fork of two parallel flanges having an aperture extending transversely therethrough which preferably contains suitable bushings through which the two cooperating shanks 36 extend upon assembly. The support tongue 30 is disposed in the clevis 28 and has a central aperture having mounted therein a spherical bearing or uniball 50 having a central aperture which is coaxially aligned with the clevis apertures for receiving the two shanks 36 therethrough.

As shown in FIG. 3, the two abutting shanks 36 having a circular cross section which completely fills the circular cross section of the uniball aperture. As shown in FIG. 2, the two shanks 36 also completely fill the circular sections of the clevis bushings. Accordingly, as thrust load is developed in the engine, it is transferred axially through the support tongue and in turn through both shanks 36, which in turn carry the thrust loads through the two flanges of the clevis 28 and axially through the thrust link 24 to the aft support 18 and finally into the aircraft 14. In this way, the clevis pin pairs 32 extend through the devises 28 at the opposite ends of the thrust link 24 to carry thrust in shear between these shanks 36 and the respective support tongues 30.

Since the flats 44 illustrated in FIG. 3 are aligned with the longitudinal axis of the thrust link 28, the collective shear carrying capability of the two adjoining shanks 36 is the same as that of the unitary cylindrical shank of the same outer diameter. Thrust load carrying capability is therefore maintained in substantially the same small volume, yet with redundant load paths. If either of the two shanks 36 should fail during operation, the remaining shank is available for maintaining suitable shear load capability until the clevis pin pair may be replaced during a maintenance outage.

As initially shown in FIG. 4, the two clevis pins 32 may be configured in a complementary nested assembly so that the two shanks 36 collectively define a bifurcated cylindrical shaft extending through the clevis and cooperating tongue. In order to maintain together the two clevis pins 32, each head 38 preferably includes a through aperture 52 laterally offset from the respective shank 36 thereof and sized for receiving axially therethrough a respective one of the tips 40 from the complementary clevis pin 32. Each shank tip 40 extends axially through the opposite head aperture 52 which laterally retains or locks together the two shanks 36.

The shank tips 40 extend through the opposite heads 38 and threadingly receive respective ones of the retention nuts 42 which are tightened to retain together the two clevis pins 32 in axial tension along their shanks between opposite ones of the heads 38. As shown in FIG. 2, the length of the shanks 36 is preferably slightly less than the collective length of the apertures through the clevis bushings and tongue uniball for clamping together these components upon assembly. Tightening the tip nuts 42 places the two shanks 36 in tension for compressing the clevis and tongue in a rigid, high strength assembly. The shank tips 40 simultaneously laterally retain together the two shanks in the collective circular configuration in the two clevis pins 32 in a dual element assembly. Or, the shank length may be greater than the collective aperture length to eliminate loads in the shanks themselves.

In the preferred embodiment illustrated in FIG. 4, each head 38 also includes a threaded stem 54 extending integrally therefrom generally coaxially with the tip 40 of the same clevis pin 32, and in parallel with the tip 40 of the cooperating clevis pin 32 extending through the adjacent head aperture 52. A retention clip 56 includes a pair of apertures therein surrounding respective ones of the tip nut 42 and the adjacent stem 54, with an identical clip 56 for the other head.

A secondary retention nut 58 threadingly engages each of the stems 54 to retain the clip to the respective heads 38, with the clip in turn retaining the respective tip nut 42. As shown in FIG. 2, the stem nut 58 clamps a portion of the clip 56 atop the head 38, with the remaining portion of the clip surrounding the tip nut 42 for preventing removal of the tip nut without firstly removing the retainer clip 56. The diameter of the aperture in the clip 56 is suitably smaller than the diameter of the bottom flange of the tip nut 42 which prevents its removal without first removing the clip.

The clevis pin pair disclosed in the exemplary embodiment of FIGS. 1–5 provides a dual element redundant load path instead of a single shear pin in the same location. Dual locking of the clevis pin pair is effected using the shank tips 40, head stems 54, and cooperating clips 56 and retention nuts. Since the two clevis pins 32 are preferably identical in configuration, the same pin type may be used for each of the cooperating two pins at each clevis location such as at both ends of the thrust link 24. This identity of parts reduces the overall number of part types for improving manufacture and inventory control.

The two pin design is compact in envelope and need not be any larger than the conventional unitary shear pin which it may replace. The dual element shear pin assembly has substantially equivalent shear strength with that of the single, cylindrical shear pin design. And, most significantly, the dual element clevis pin design provides redundant load paths for increasing the safety of operation of the aft mount.

Figure 6:
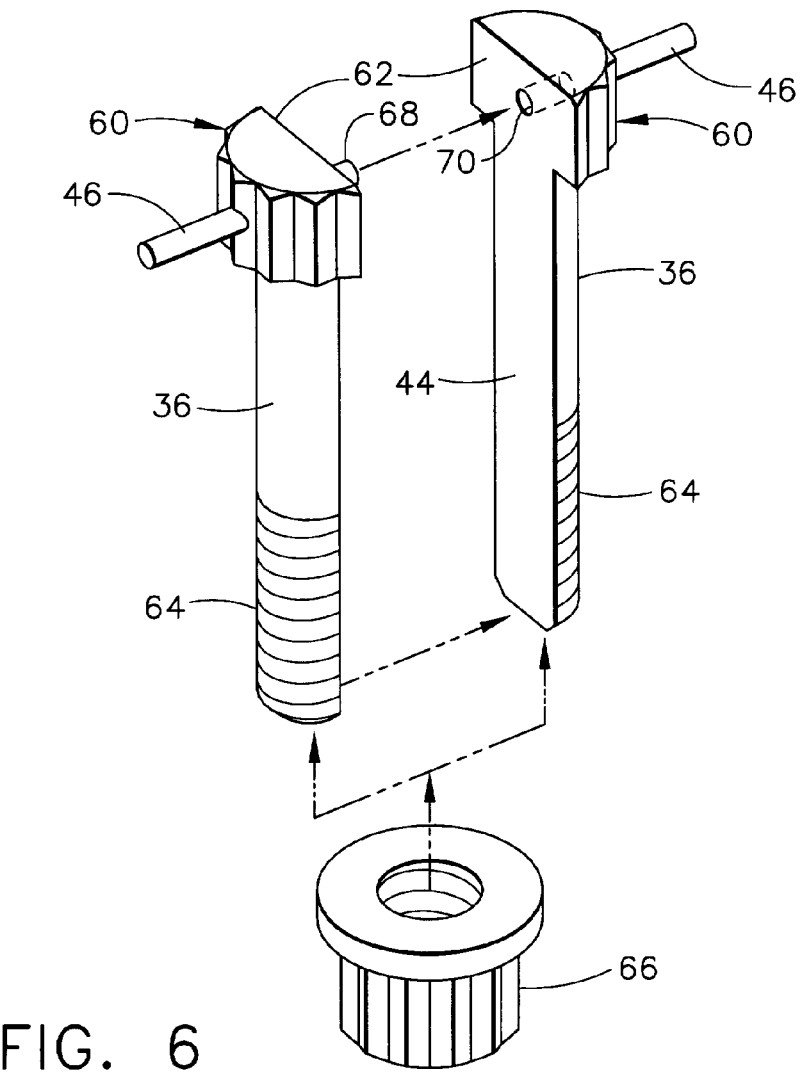
FIG. 6 is an exploded, isometric view of a clevis pin pair in accordance with an alternate embodiment of the present invention.

FIG. 6 illustrates an alternate embodiment of a cooperating pair of substantially identical clevis pins designated 60. In this design, the shank 36 is again semicircular in section with cooperating flats 44 which collectively define the diametrically bifurcated circular section for redundant load paths. However, in this design, the head 62 and shank tip 64 are also semicircular in section, and coextensive with the corresponding semicircular shanks 36. The clevis pins 60 illustrated in FIG. 6 are basically two identical halves of a single clevis pin or bolt, with the adjoining shank tips 64 being collectively threaded for threadingly receiving a common retention nut 66 thereon. In this simple embodiment, the two pins 60 are assembled together and positioned through the respective devises at both ends of the thrust link 24 illustrated in FIG. 1, and retained therein after assembly of the retention nuts 66.

Like the first embodiment illustrated in FIG. 2, the second embodiment illustrated in FIG. 6 may also include similar alignment tabs 46 extending radially outwardly from the respective heads 62 for providing a visual indication for orienting the shank flats 44 coaxially with the thrust link 24. In FIG. 2, the alignment tabs 46 are aligned parallel with the shank flats 44, whereas in FIG. 6, the tabs 46 are aligned perpendicularly thereto. In either case, the tabs 46 may be suitably positioned relative to the thrust link for aligning the shank flats coaxially with the thrust link in the preferred embodiment.

If desired, one, or both, of the clevis pins 60 may also include an assembly tab 68 with a complementary recess 70 in the opposite pin half which ensure proper alignment of the two head halves of the clevis pin pair in an axisymmetrical assembly.

The second embodiment, like the first embodiment, also enjoys the advantages of providing redundant shear load paths through the two shanks 36 in the common apertures of the respective devises 28 and cooperating tongues 30. In alternate embodiments, the cooperating clevis pins may be otherwise configured in complementary shapes for collectively providing a bifurcated cylindrical shank for carrying shear loads between the thrust link 24 and its two adjoining stationary supports. And, the redundant pin pair may be used at other locations in aircraft engine mounts for redundancy as required.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. An aircraft engine thrust mount clevis pin for joining a clevis on a thrust link to a tongue on a support in an aircraft engine thrust mount comprising:

a shank having a uniform semicircular section sized in length to extend through said clevis and tongue disposed therein for carrying in shear thrust load between said thrust link and support;

a head integrally joined to one end of said shank for being disposed outside said clevis; and a tip integrally joined to an opposite end of said shank for being disposed outside said clevis.

2. A pin according to claim 1 wherein said tip is threaded for engaging a retention nut.

3. A pin according to claim 2 wherein:

said shank includes a flat; and said head includes an alignment tab having a fixed orientation with said flat.

4. A pin according to claim 3 wherein said head and tip are semicircular in section, and coextensive with said semicircular shank.

5. A pin according to claim 3 wherein said head and tip are annular.

6. A pin according to claim 5 wherein said head includes an aperture laterally offset from said shank.

7. A pair of said aircraft engine thrust mount clevis pins according to claim 6 being identical to each other, with said shank flats being abutting in a collective circular section, and said shank tips extending through respective ones of said head apertures.

8. A clevis pin pair according to claim 7 further comprising a pair of said retention nuts threadingly engaging respective ones of said tips to retain laterally together said shanks between opposite ones of said heads.

9. A clevis pin pair according to claim 8 further comprising:

a threaded stem extending from each of said heads in parallel with said tip extending therethrough;

a retention clip having a pair of apertures surrounding respective ones of said tip nuts and stems for each of said heads; and a secondary retention nut threadingly engaging each of said stems to retain said clip to said head, with said clip retaining said tip nut on said tip.

10. A clevis pin pair according to claim 9 in combination with said thrust link and support, with said shank flats being aligned by said tab axially therebetween.

11. A clevis pin pair combination according to claim 10 wherein:
   said thrust link includes a clevis;
   said support includes a tongue disposed in said clevis; and
   said pin pair extend through said clevis and tongue to carry said thrust in shear therebetween.

12. A clevis in pair combination according to claim 10 wherein said clevis includes an alignment recess receiving said alignment tab for aligning said shank flats axially between said thrust link and said support.

13. An aircraft engine thrust mount clevis pin comprising:
   a shank having a uniform semicircular section, with a flat extending the full axial length and width thereof;
   an annular head integrally joined to one end of said shank; and
   an annular tip integrally joined to an opposite end of said shank.

14. A pin according to claim 13 wherein said head includes an aperture laterally offset from said shank.

15. A pair of said aircraft engine thrust mount clevis pins according to claim 14 being abutting in a collective circular section, and said shank tips extending through respective ones of said head apertures.

16. A clevis pin pair according to claim 15 wherein said shank tips are threaded.

17. A clevis pin pair according to claim 16 further comprising a pair of retention nuts threadingly engaging respective ones of said tips atop respective ones of said heads to retain laterally together said shanks between opposite ones of said heads.

18. A clevis pin pair according to claim 17 further comprising:
   a threaded stem extending from each of said heads in parallel with said tip extending therethrough;
   a retention clip having a pair of apertures surrounding respective ones of said tip nuts and stems for each of said heads; and
   a secondary retention nut threadingly engaging each of said stems to retain said clip to said head, with said clip retaining said tip nut on said tip.

19. A clevis pin pair according to claim 17 wherein each of said heads includes an alignment tab having a fixed orientation with said flat.

20. An aircraft engine thrust mount comprising:
   a support for being fixedly mounted to an aircraft engine, and including a tongue;
   a thrust link having a clevis integrally formed at one end thereof, and receiving said support tongue therein;
   a pair of adjoining clevis pins extending through said clevis and tongue for carrying thrust load therebetween, and each of said clevis pins includes:
   a shank having a semicircular section for carrying in shear therethrough thrust load between said thrust link and support;
   a head integrally joined to one end of said shank; and
   a tip integrally joined to an opposite end of said shank.

21. A mount according to claim 20 wherein each of said shanks includes a flat abutting together in a collective circular section.

22. A mount according to claim 21 wherein said shank flats are aligned with a longitudinal axis of said thrust link.

23. A mount according to claim 22 further comprising an alignment tab extending from one of said pin heads and disposed in said clevis for aligning said flats with said link longitudinal axis.

24. A mount according to claim 22 wherein said heads and tips are annular.

25. A mount according to claim 22 wherein each of said heads includes an aperture laterally offset from its attached shank receiving therethrough said tip from said adjoining shank.

26. A mount according to claim 25 wherein said tips are threaded and retain corresponding retention nuts atop said pin heads.

27. A mount according to claim 26 further comprising:
   a threaded stem extending from each of said heads in parallel with said tip extending therethrough;
   a retention clip having a pair of apertures surrounding respective ones of said tip nuts and stems for each of said heads; and
   a secondary retention nut threadingly engaging each of said stems to retain said clip to said head, with said clip retaining said tip nut on said tip.

* * * * *